United States Patent [19]

Iwasaki et al.

[11] Patent Number: 4,949,241

[45] Date of Patent: Aug. 14, 1990

[54] MICROCOMPUTER SYSTEM INCLUDING A MASTER PROCESSOR AND A SLAVE PROCESSOR SYNCHRONIZED BY THREE CONTROL LINES

[75] Inventors: Junichi Iwasaki; Shingo Kojima, both of Tokyo, Japan

[73] Assignee: NEC Corporation, Tokyo, Japan

[21] Appl. No.: 260,699

[22] Filed: Oct. 21, 1988

[30] Foreign Application Priority Data

Oct. 22, 1987 [JP] Japan .................................. 62-267796

[51] Int. Cl.$^5$ .............................................. G06F 15/16
[52] U.S. Cl. .................................... 364/200; 364/230; 364/230.4
[58] Field of Search ... 364/200 MS File, 900 MS File

[56] References Cited

U.S. PATENT DOCUMENTS

| | | | |
|---|---|---|---|
| 4,395,758 | 7/1983 | Helenius .............................. | 364/200 |
| 4,509,116 | 4/1985 | Lackey et al. ...................... | 364/200 |
| 4,547,849 | 10/1985 | Louie et al. ........................ | 364/200 |
| 4,679,166 | 7/1987 | Berger et al. ....................... | 364/900 |
| 4,695,945 | 9/1987 | Irwin .................................... | 364/200 |
| 4,715,013 | 12/1987 | MacGregor et al. ............... | 364/900 |

Primary Examiner—David Y. Eng
Attorney, Agent, or Firm—Foley & Lardner, Schwartz, Jeffery, Schwaab, Mack, Blumenthal & Evans

[57] ABSTRACT

A microcomputer system includes a master processor and a coprocessor interconnected via a bus. The coprocessor supplies first, second and third signals to the master process, the first ($\overline{BUSY}$) signal taking an active level when the coprocessor requests a wait condition of the master processor, the second (CPERR) signal taking an active level at least when the first signal is changed to the inactive level in a state of occurrence of an arithmetic exception in the coprocessor, and the third (CPEND) signal taking an active level when the coprocessor is free of execution of an instruction and of an occurrence of an arithmetic exception. When the coprocessor executes an instruction whose execution result is not required to be returned to the master processor, the master processor detects the level of the third signal and if the third signal is at the active level, the master processor starts to execute subsequent instructions irrespective of the first and second signals, in parallel with the execution of the instruction by the coprocessor.

6 Claims, 9 Drawing Sheets

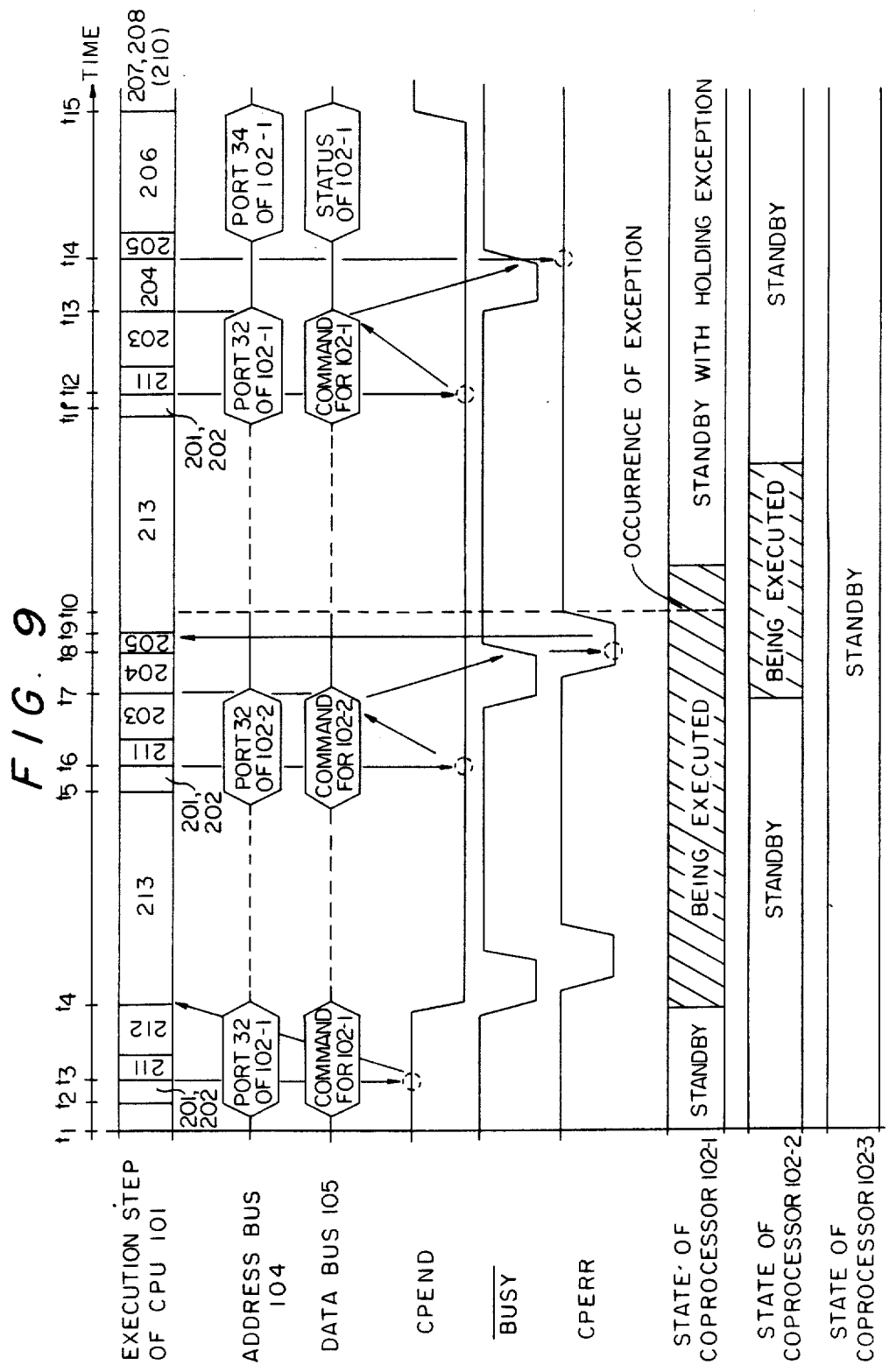

MICROCOMPUTER SYSTEM INCLUDING A MASTER PROCESSOR AND A SLAVE PROCESSOR·SYNCHRONIZED BY THREE CONTROL LINES

CROSS REFERENCE TO RELATED APPLICATION

This application is related to the following commonly assigned copending applications:

Ser. No. 07/119,601, filed by for Takashi Nakayama on Nov. 12, 1987, under a title of "Micro Processor Capable of Being Connected with Coprocessor". Ser. No. 07/279,795, filed by Takahiro Tokuume on Dec. 5, 1988, under a title of "microprocessor Operable Under Direct Connection to Coprocessor".

BACKGROUND OF THE INVENTION

The present invention relates to a microcomputer system and, more particularly, to a microcomputer system wherein a master processor and at least one coprocessor are interconnected via a bus.

In a microprocessor fabricated on a single semiconductor chip, a very large number of circuit elements are required but the number of circuit elements capable of being formed in the single chip is limited. Therefore, it is difficult to fabricate such a unit in a single chip that executes high level instructions such as a floating-point arithmetic operations, a function arithmetic operations, etc., at a high speed. In order to solve this problem, a coprocessor is employed, which executes the high level instructions in place of the microprocessor. The coprocessor operates under the control of the microprocessor and is thus called a "slave processor". The microprocessor operates by itself as a central processing unit (CPU) to control the coprocessor along with a memory and peripheral units and is thus called a "master processor".

When the master processor decodes a high level instruction, it makes access to the slave processor to transfer the high level instruction as well as one or more operands, if necessary. The slave processor is thereby brought into an operative condition to execute the high level instruction thus supplied. If the master processor is not connected with a slave processor, it should execute the high level instructions by use of its own arithmetic unit. Therefore, the master processor is required to detect whether or not the slave processor is connected thereto. In a case where a slave processor is provided, moreover, if an arithmetic exception occurs in the arithmetic result or arithmetic procedure of the slave processor, the master processor should perform the processing operation for the arithmetic exception occurring in the slave processor. Therefore, the master processor is further required to detect whether or not the status information of the slave processor should be read.

For these purposes, the master processor includes first and second terminals supplied respectively with a busy signal and a status read request signal from the slave processor, as disclosed in the above copending application. When the master processor decodes and transfers the high level instruction to the slave processor, the slave processor changes the busy signal from an inactive level to an active level and holds the active level of the busy signal during the executing period thereof. When the slave processor completes the execution of the high level instruction, it changes the busy signal from the active level to the inactive level. At this time, if no arithmetic exception occurs, the slave processor produces an inactive level of the status read request signal when it changes the busy signal from the active level to the inactive level. In contrast, if the arithmetic exception occurs, the slave processor produces an active level of the status read request signal. On the other hand, the master processor detects the level of the first terminal, i.e. the level of the busy signal, and further detects the level of the status read request signal supplied to the second terminal when the busy signal is in the inactive level. Thus, if the slave processor is not connected, both the first and second terminals of the master processor, i.e. both the busy signal and status read request signal terminals, are maintained to the inactive level and the active level, respectively. On the other hand, in cases where the slave processor is connected and no arithmetic exception occurs, the status read request signal is in the inactive level when the busy signal is changed from the active level to the inactive level. As a result, the master processor can detect whether or not the slave processor is connected thereto and whether or not the arithmetic exception occurs in the slave processor.

The high level instructions to be executed by the slave processor are divided into two types: the first type of instructions are such that the execution result is required to be returned to the master processor and the second type of instructions are such that the execution result is not required to be returned to the master processor and is stored into, for example, a register of the slave processor. When the first type instruction is read from an instruction memory, the master processor must wait for the completion of the execution of this type of instruction by the slave processor. On the other hand, when the slave processor executes a second type high level instruction, the master processor can execute subsequent low level instructions in parallel to the execution of the second type high level instruction by the slave processor.

Although the master processor does not require the execution result of the second type high level instruction, it should detect whether or not the arithmetic exception occurs in the slave processor and, if it occurs, read the status information to detect the kind of arithmetic exception. To this end, the master processor always detects the levels at the first and second terminals, i.e. the levels of the busy signal and the status read request signal, after transferring the high level instruction, irrespective of the type of the high level instruction which is now to be executed by the slave processor. When the slave processor receives a new high level instruction, if the arithmetic exception has occurred in the execution result or the executing procedure of the preceding second type instruction, the slave processor changes the busy signal to the active level and immediately returns it to the inactive level, holding the status read request signal at the active level. In a case where the arithmetic exception has not occurred, the slave processor changes the busy signal to the active level and after changing the status read request signal to the inactive level, returns the busy signal to the inactive level. Thus, the master processor can detect whether or not the arithmetic exception has occurred in the execution of the second type high level instruction by the slave processor. However, since the master processor detects the levels of the first and second terminals whenever the high level instruction is decoded, execution of subsequent low level instructions is delayed when a new second type high level instruction is decoded and when the arithmetic exception has not occurred in the execution of the preceding second type high level instruction.

SUMMARY OF THE INVENTION

Therefore, a primary object of the present invention is to provide an improved microcomputer system in which a master processor and at least one slave processor are interconnected via a bus.

Another object of the present invention is to provide a microcomputer system in which a master processor can execute at least one low level instruction in parallel to the execution of a high level instruction by a slave processor without delaying the starting time of the execution of the low level instruction.

Still another object of the present invention is to provide an improved master processor or microprocessor capable of being connected with at least one coprocessor and capable of executing at least one instruction while the coprocessor is executing another instruction.

A microcomputer system according to the present invention comprises a master processor, a coprocessor, and a bus interconnecting the master processor and the coprocessor. The master processor includes first, second and third terminals supplied respectively with first, second and third signals from the coprocessor. The first signal corresponds to the above-mentioned busy signal and thus takes an active level when the master processor is required to be in a wait condition, and the second signal corresponds to the above-mentioned status read request signal and thus takes an active level at least when the first signal is changed from the active level to an inactive level when an arithmetic exception occurs. The third signal provided in accordance with the present invention takes an active level when the coprocessor is not executing an instruction and when arithmetic exception does not occur in the execution of a preceding instruction. The master processor further includes detecing means coupled to the third terminal for detecting the level of the third signal, means, responsive to a first output of the detecting means representative of the active level of the third signal, for executing at least one instruction in parallel to the execution of the coprocessor irrespective of the levels of the first and second terminals, and means, responsive to a second output of the detecting means representative of the inactive level of the third signal, for bringing the master processor into a wait condition until the first signal is changed to the inactive level and for performing a subsequent processing operation responsive to the second signal after the first signal is changed to the inactive level.

Thus, when the second type high level instruction is read out and the third signal takes the active level at this time, the master processor can start the execution of at least one subsequent instruction in parallel to the execution of that second type high level instruction by the coprocessor without being brought into the wait condition by the first signal. The executing start timing of the subsequent instruction is thereby.

BRIEF DESCRIPTION OF THE DRAWINGS

The above and other objects, advantages and features of the present invention will be more apparent from the following description taken in conjunction with the accompanying drawings, in which:

FIG. 9 is a timing chart representative of operations of a microcomputer system shown in FIG. 8.

DETAILED DESCRIPTION OF THE PREFERRED EMBODIMENTS

Figure 1:
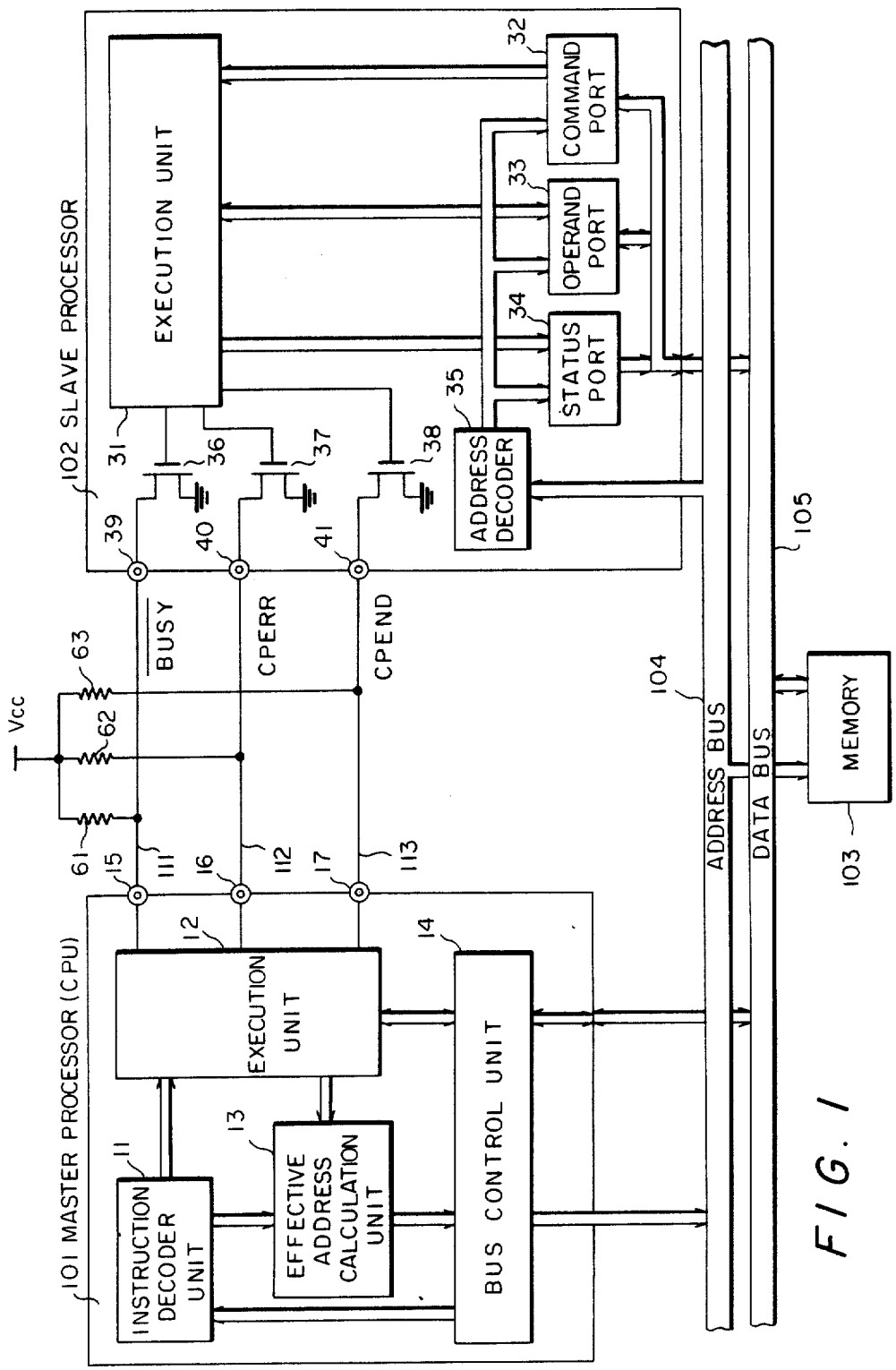
FIG. 1 is a block diagram representative of an embodiment of the present invention.

Referring to FIG. 1, a microcomputer system according to an embodiment of the present invention includes a master processor 101 as a CPU, a slave processor 102 as a coprocessor and a memory 103 which are interconnected via an address bus 104 and a data bus 105. The slave processor 102 operates under the control of the master processor 101 and executes at a high speed high level instructions such as a floating-point arithmetic operation, a function arithmetic operation, etc., in place of the master processor 101. The memory 103 stores data and a program including low level instructions and high level instructions and is accessed by the master processor 101.

The master processor 101 includes an instruction decoder unit 11 for decoding instructions which are executed by the master and slave processors 101 and 102, an execution unit 12 for controlling the whole entire operation of the master processor 101 and executing the low level instructions under the sequential control of a microprogram, an effective address calculation unit 13 for calculating an effective address of each operand for the respective instructions, and a bus control unit 14 for controlling the address and data buses 104 and 105 to make access to the memory 103 and the slave processor 102. These units 11 to 14 are coupled as shown via internal buses. The master processor 101 further includes a first input terminal 15 supplied with a BUSY signal, a second input terminal 16 supplied with a CPERR signal and a third input terminal 17 supplied with a CPEND signal.

The slave processor 102 includes an execution unit 31 for performing an arithmetic operation responsive to each of the high level instructions, a command port 32 for receiving and temporarily storing command codes (opcodes) of each instruction transferred via the data bus 105, a status port 34 for temporarily storing the status information supplied from the execution unit 31 and outputting it onto the data bus 105, an operand port 33 for temporarily storing one or more operands transferred via the data bus 105 for the arithmetic operation of the unit 31 and receiving the execution result from the unit 31 and outputting the result onto the data bus 105, if necessary. The slave processor 102 also includes an address decoder 35 for decoding address information supplied via the address bus 104 and selecting one of the units 32, 33 and 34 in response thereto to write or read data into or from the selected unit. These units 31 to 35 are coupled as shown via internal buses. The slave processor 102 further includes three output terminals 39, 40 and 41 and three transistors 36, 37 and 38 of an open-drain type. Each of the transistors 36, 37 and 38 has a drain-source path connected between each of the terminals 39, 40 and 41 and a ground point and a gate connected the execution unit 31.

The output terminals 39, 40 and 41 of the slave processor 102 are connected to the input terminals 15, 16 and 17 of the master processor 101 via signal lines 111, 112 and 113, respectively. These lines are in turn pulled up to a power voltage via resistors 61, 62 and 63, respectively. Accordingly, so long as the transistors 36 to 38 are in the nonconductive state, the BUSY, CPERR and CPEND signals, i.e. the input terminals 15 to 17 of the master processor 101, are maintained at the high level. When the slave processor 102 receives the first type of the high level instruction representing that execution result is required to be returned to the master processor 101, the execution unit 31 of the slave processor 102 turns the transistor 36 ON to change the BUSY signal to an active level (low level in this embodiment) until the execution of the receiving instruction is completed. On the other hand, when the slave processor 102 receives the second type of the high level instruction representing that the execution result is not required to be returned to the master processor 101, the execution unit 31 thereof -turns turns the transistor 36 ON and immediately thereafter turns it OFF. Accordingly, the BUSY signal is changed to the low level and immediately returned to the high level. However, when the slave processor 102 receives a subsequent second type instruction while it is executing the current second type instruction, the execution unit 31 retains the transistor 36 in the conductive state to produce the low level BUSY signal until the completion of the execution of the current second type instruction. The execution unit 31 of the slave processor 102 turns the transistor 37 ON along with changing the transistor 36 from the conductive state to the nonconductive state, when an arithmetic exception occurs in the execution result or the executing procedure of the high level instruction. The CPERR signal thereby takes an inactive level (the high level). On the other hand, when the arithmetic exception occurs or when the master processor 101 does not yet read from the status port 34 the status information representative of the arithmetic exception, the transistor 37 is held in the nonconductive state to produce an active level (the high level) of the CPERR signal. The execution unit 31 of the slave processor 102 turns the transistor 38 ON during the executing period of the high level instruction, and when the arithmetic exception occurs, it retains the transistor 38 in the conductive state until the master processor 101 reads from the status port 34 the status information representative of the arithmetic exception. When the slave processor 102 is free of the executing state of the high level instruction and when it stores no arithmetic exception, the transistor 38 is in the nonconductive state. The CPEND signal thereby takes an active level (the high level). Since the active and inactive levels of the BUSY, CPERR and CPEND signals are determined as described above, the master processor 101 can judge the operating state of the slave processor 102 by detecting the levels of the input terminals 15, 16 and 17.

Figure 2:
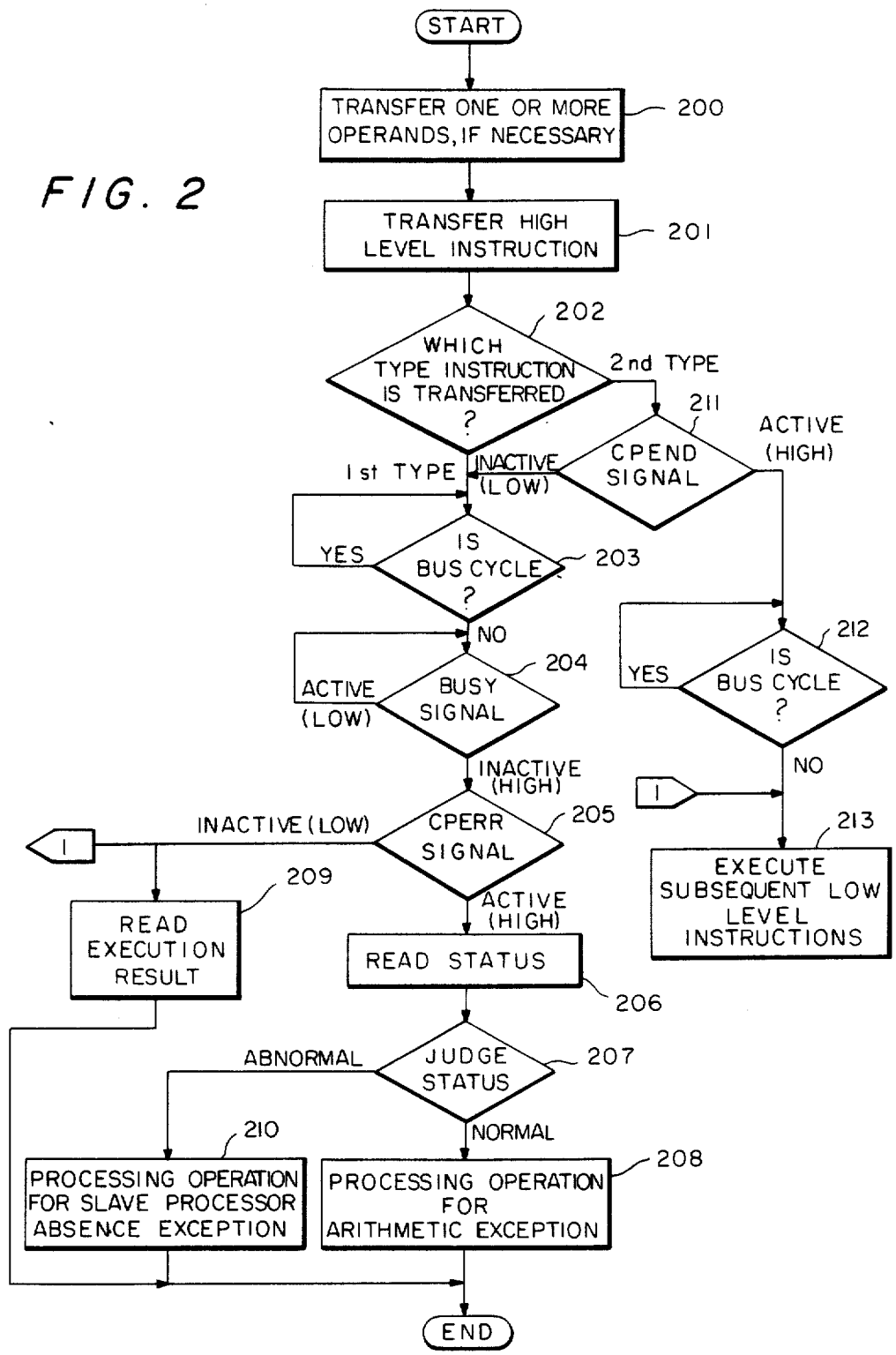
FIG. 2 is a flow chart representative of a sequence control procedure of a master processor shown in FIG. 1.

When the high level instruction to be executed by the slave processor 102 is read from the memory 103 and then decoded by the instruction decoder unit 11 of the master processor 101, a protocol operating procedure between the master and slave processors 101 and 102 is activated in accordance with the microprogram stored in execution unit 12. This procedure is shown in FIG. 2 as a flow chart. Assuming that the read-out instruction denotes a dyadic operation on two operands stored in the memory 103, the execution unit 12 prompts the bus control unit 103 to read these operands from the memory 14 and to transfer them to the operand port 33 of the slave processor 102. Thus, the bus control unit 14 controls the address and data buses 104 and 105 to write the operands into the operand port 33 (step 200). If the operands have already been provided in registers of the slave processor 102, the step 200 is not carried out. Thereafter, the command code (opecode) of the high level instruction is transferred to the command port 32 of the slave processor 102 via the data bus 105 under the control of the bus control unit 14 (step 201). In a subsequent step 202, it is judged which type of instruction is transferred. Assuming that the instruction to be transferred or executed is the second type instruction representing that the execution result is not required to be returned to the master processor 101, a step 211 is performed.

Figure 3:
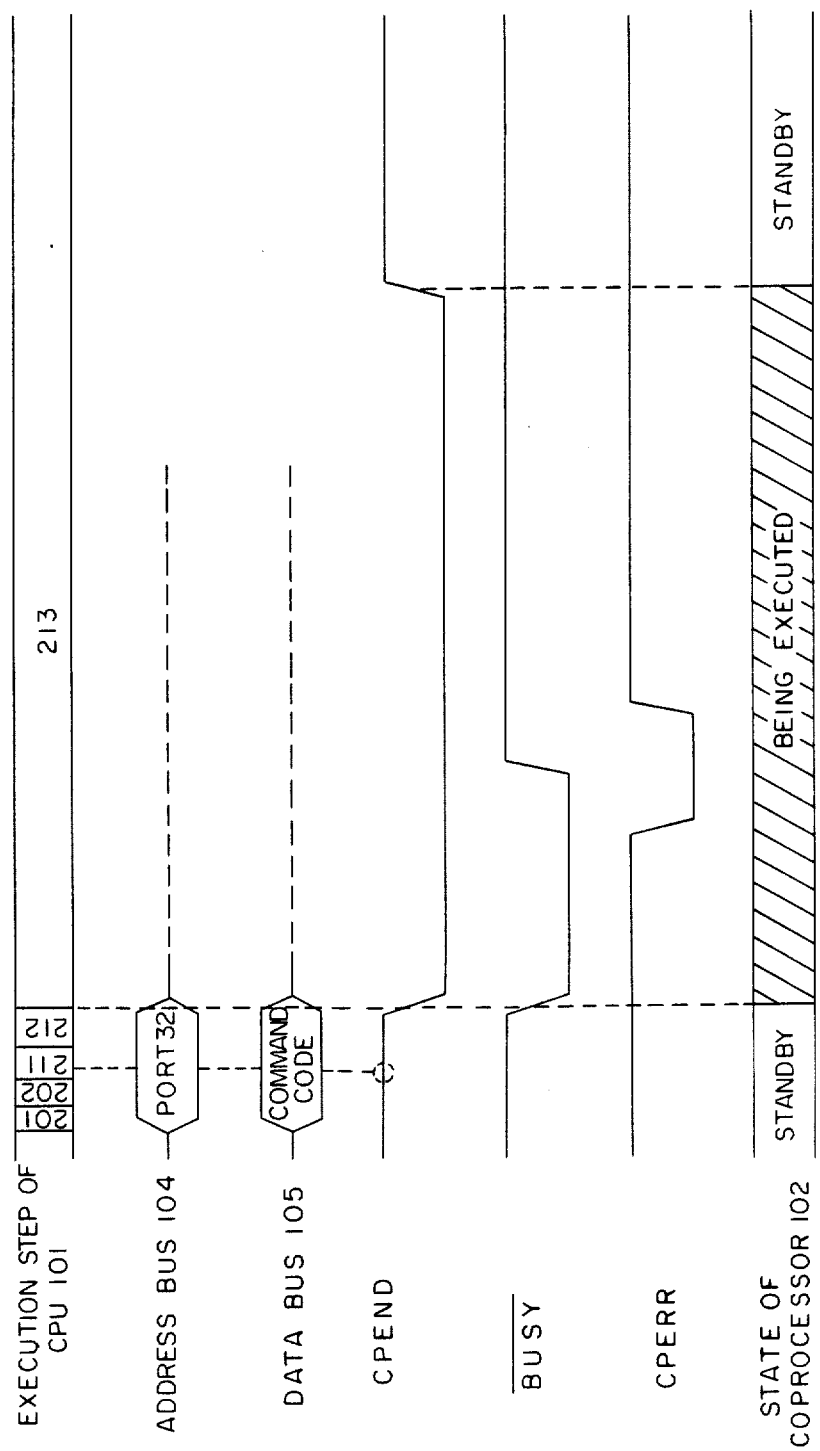
FIGS. 3, 4, 5, 6 and 7 are timing charts each representative of operations of a microcomputer system shown in FIG. 1.

In this step 211, the execution unit 12 of the master processor 101 detects the level of the terminal 17, i.e. the CPEND signal and does, not detect the levels of the terminals 15 and 16, i.e. the BUSY and CPERR signals, in accordance with the present invention. Assuming that the slave processor 102 is not in the executing state (i.e., the slave processor is in the standby state) and that the arithmetic exception has not occurred in the execution of the preceding high level instruction, the CPEND signal, i.e. the terminal 17, takes the active level (high level), as shown in FIG. 3. Therefore, the master processor 101 waits for the completion of the bus cycle for transferring the command code to the command port 32 (step 212) and then reads and executes the subsequent instructions (step 213). That is, the master processor 101 executes the subsequent instructions in parallel to the execution of the second type high level instruction by the slave processor 102, as shown in FIG. 3. Since the level of the BUSY signal is not detected, the active level thereof is ignored. When the slave processor 102 completes the execution of the instruction without occurrence of the arithmetic exception, it stores the execution result into the internal register thereof and turns the transistor 38 OFF to produce the active level of the CPEND signal, as shown in FIG. 3.

Figure 4:
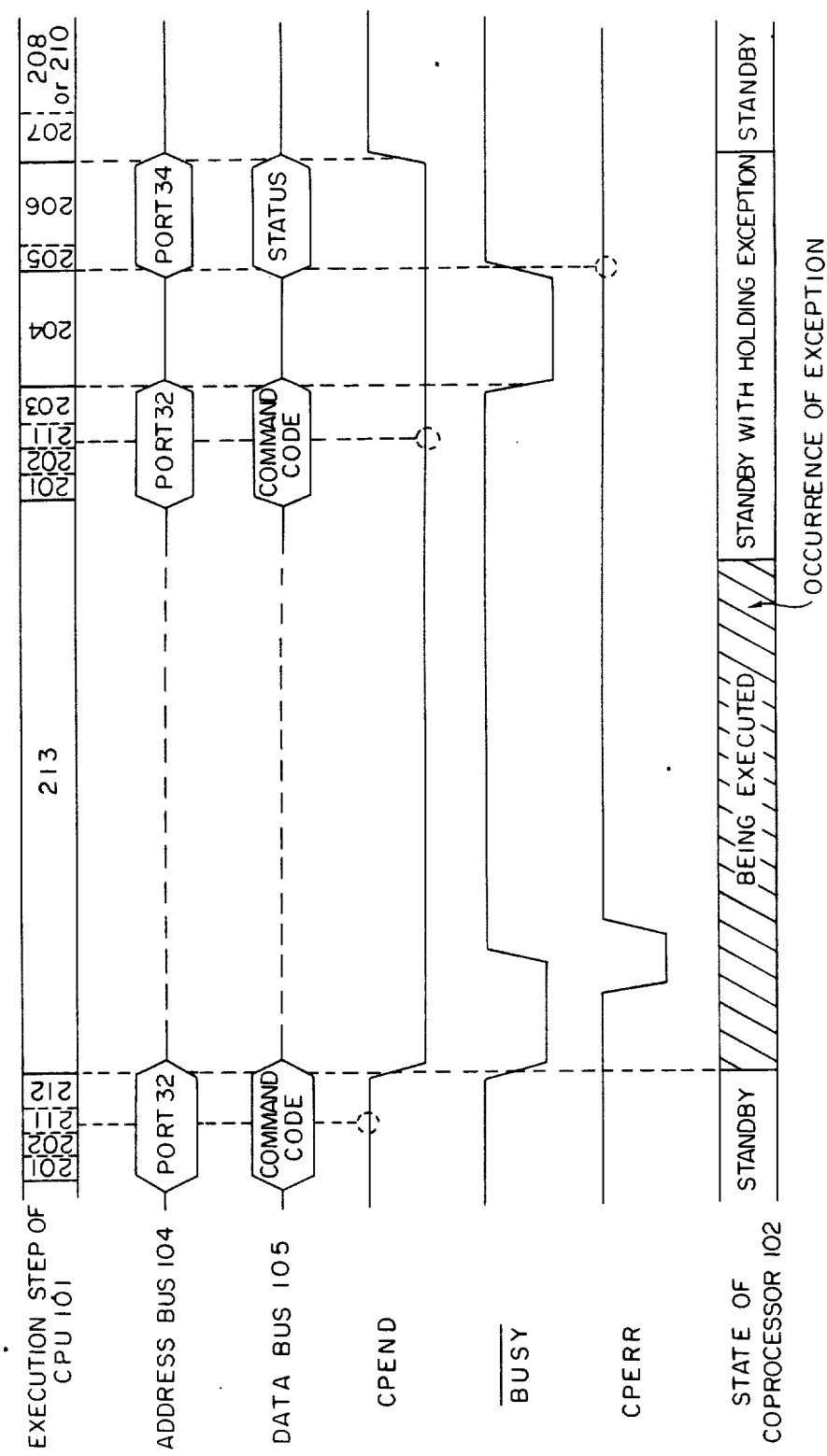

In contrast, when the arithmetic exception occurs in the execution of the second type instruction, the execution unit 31 of the slave processor 102 maintains the transistor 38 in the conductive state to produce the inactive level (low level) of the CPEND signal, as shown in FIG. 4. The unit 31 further writes into the status port 34 the status information representative of the arithmetic exception. In this condition, when a subsequent second type high level instruction is read out of the memory and decoded by the unit 11, the master processor 101 performs the steps 200, 201, 202 and 211, but the CPEND signal takes the inactive level, so that the operating procedure shifts to a step 203. In this step 203, the master processor 101 waits for the completion of writing the command code of that subsequent second type high level instruction into the command port 32. In response thereto, the execution unit 31 turns the transistor 36 ON and immediately thereafter turns it OFF. Since the status port 34 stores the information representative of the exception, the unit 31 turns the transistor 36 OFF while retaining the transistor 37 in the nonconductive state to produce the active level of the CPERR signal, as shown in FIG. 4. On the other hand, the master processor 101 is brought into a wait condition until the BUSY signal takes the inactive level (step 204) and thereafter it detects the level of the CPERR signal (step 205). Since the CPERR signal is at the active level, the master processor 101 reads the status information out of the status port 34 of the slave processor 102 (step 206), as-shown in FIG. 4. The read-out status information is judged in a step 207, and in accordance with the value thereof, the master processor 102 performs a processing operation for the arithmetic exception (step 208) or a processing operation for the slave processor absence exception (step 210). Since the exception information stored in the port 34 has been read out, the execution unit 31 turns the transistor 38 OFF to produce the active level of the CPEND signal. During the processing operation for the exception by the master processor 101, the slave processor 102 is brought into the standby condition. After the completion of the processing operation for the exception, the master processor 101 restarts to execute the program from the suspended address.

Figure 5:
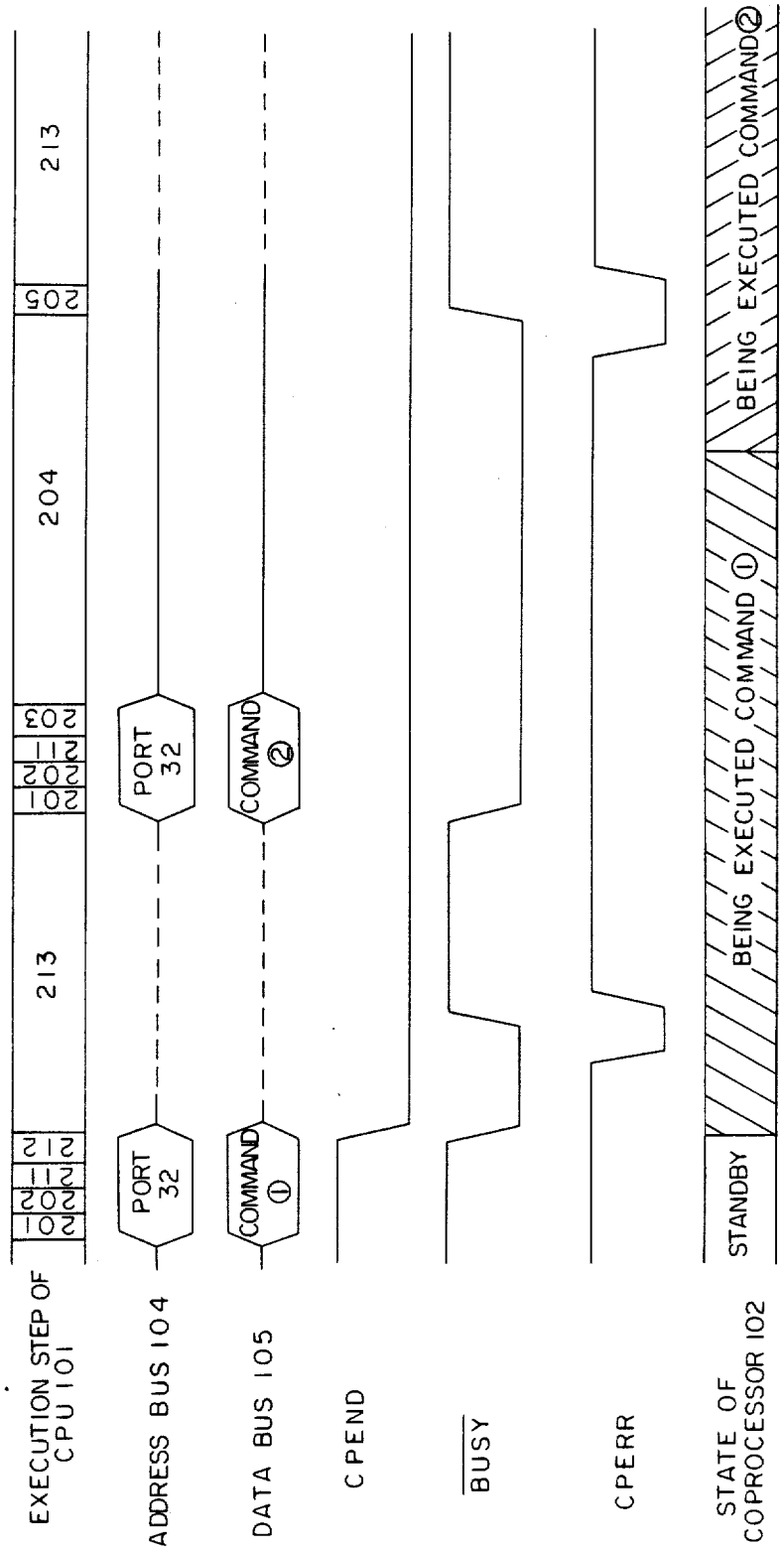

Assume that, as shown in FIG. 5, a subsequent second type high level instruction 2 is read from the memory 103 while the slave processor 102 is executing the preceding second type high level instruction 1 . In response to the reading-out of the subsequent instruction 2 , the master processor 101 performs the steps 200, 201 and 202 and advances to the step 211. Since the slave processor 102 is still in the executing state of the instruction, the CPEND signal takes the inactive level, as shown in FIG. 5. Therefore, the master processor 101 waits for the end of the bus cycle (step 203) and detects the level of the BUSY signal. In response to a fact that the command code of the subsequent instruction 2 is written into the command port 32, the slave processor 102 turns the transistor 36 ON, and in this case the execution unit 31 is in the executing state of the instruction 1 , so that the transistor 36 is held in the conductive state to maintain the active level of BUSY signal until the execution of instruction 1 is completed, as shown in FIG. 5. As a result, the master processor 101 is brought into the wait condition (step 204). When the execution of the instruction 1 is completed without arithmetic exception, the execution unit 31 turns the transistor 36 OFF while turning the transistor 37 ON. The execution unit 31 further starts to execute the instruction 2 , so that the transistor 38 is held in the conductive state. In response to the change of the BUSY signal to the inactive level, on the other hand, the master processor 101 detects the inactive level of the CPERR signal (step 205). It should be noted that the instruction 1 is the second type instruction. Therefore, the master processor 101 executes the subsequent instructions (step 213).

Figure 6:
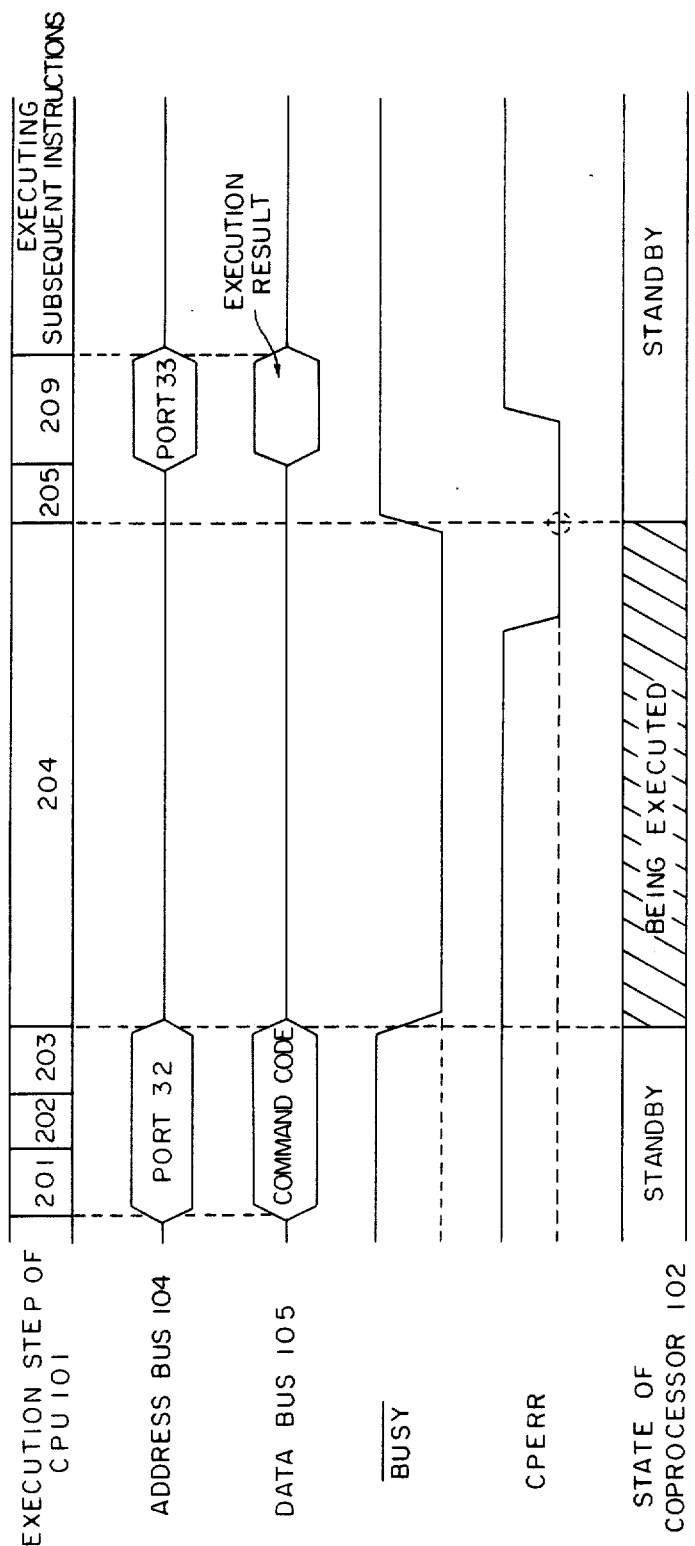

When the first type high level instruction is read from the memory 103 and decoded by the unit 11, the master processor 101 performs the steps 200, 201, 202 and 203. The step 211 is not performed and the CPEND signal is ignored. On the other hand, the slave processor 102 maintains the BUSY signal at the active level until completion of this first type of instruction, as shown in FIG. 6. During this period, the master processor 101 is brought into the wait condition (step 204). When the execution of the first type of instruction is completed without occurrence of the arithmetic exception, the slave processor 102 changes the BUSY signal to the inactive level while producing the inactive level of the CPERR signal, as shown in FIG. 6. The slave processor 102 writes the execution result into the operand port 33 thereof. The master processor 101 responds to the inactive level of the CPERR signal (step 205) and accesses the operand port 33 to read the execution result therefrom (step 209).

Figure 7:
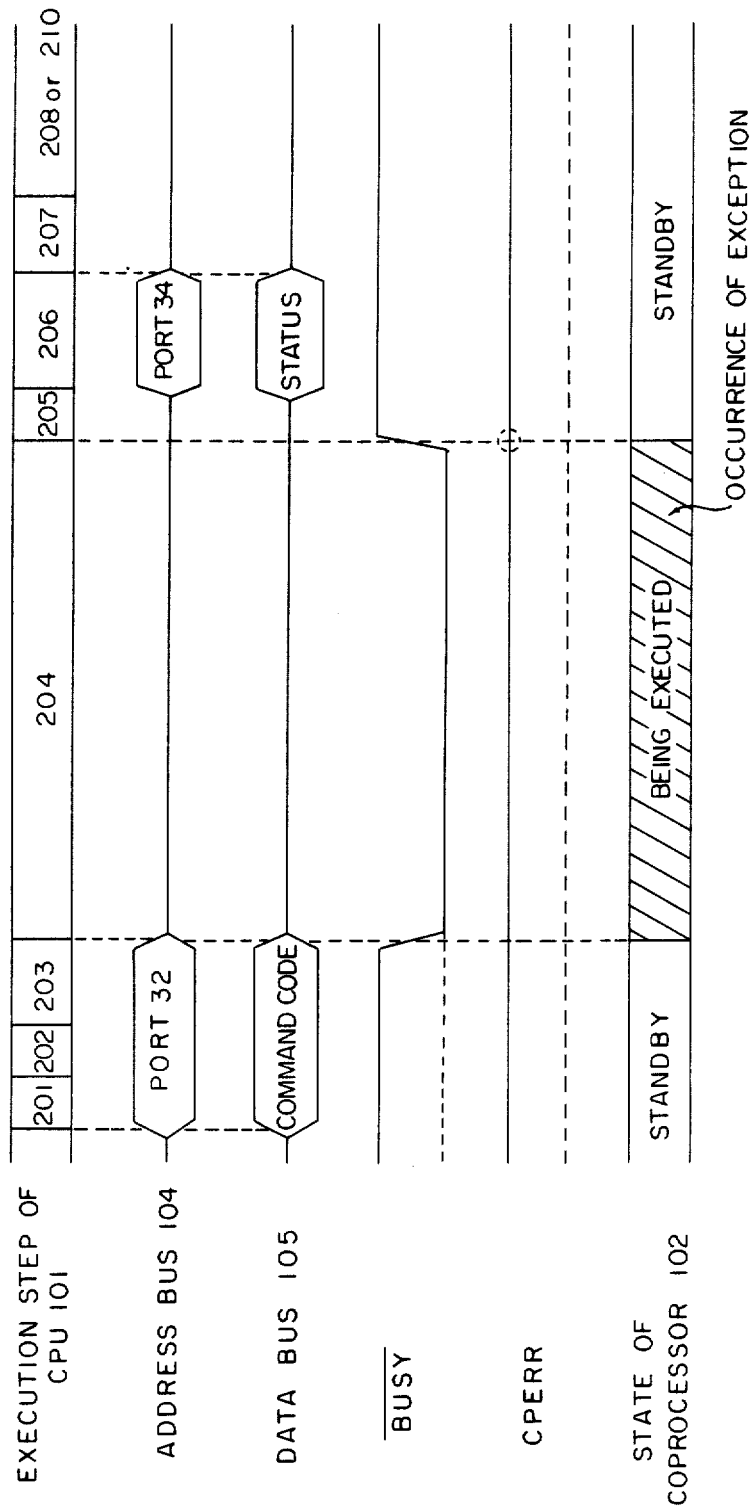

In contrast, when the arithmetic exception occurs in the execution of the first type of instruction, the slave processor 102 changes the BUSY signal to the inactive level while maintaining the active level of the CPERR signal, as shown in FIG. 7. Accordingly, the master processor 101 accesses to the status port 34 to read the status information therefrom (step 206), judges the status (step 207) and performs the processing operation for the exception (step 208 or 210), as shown in FIG. 7.

Figure 8:
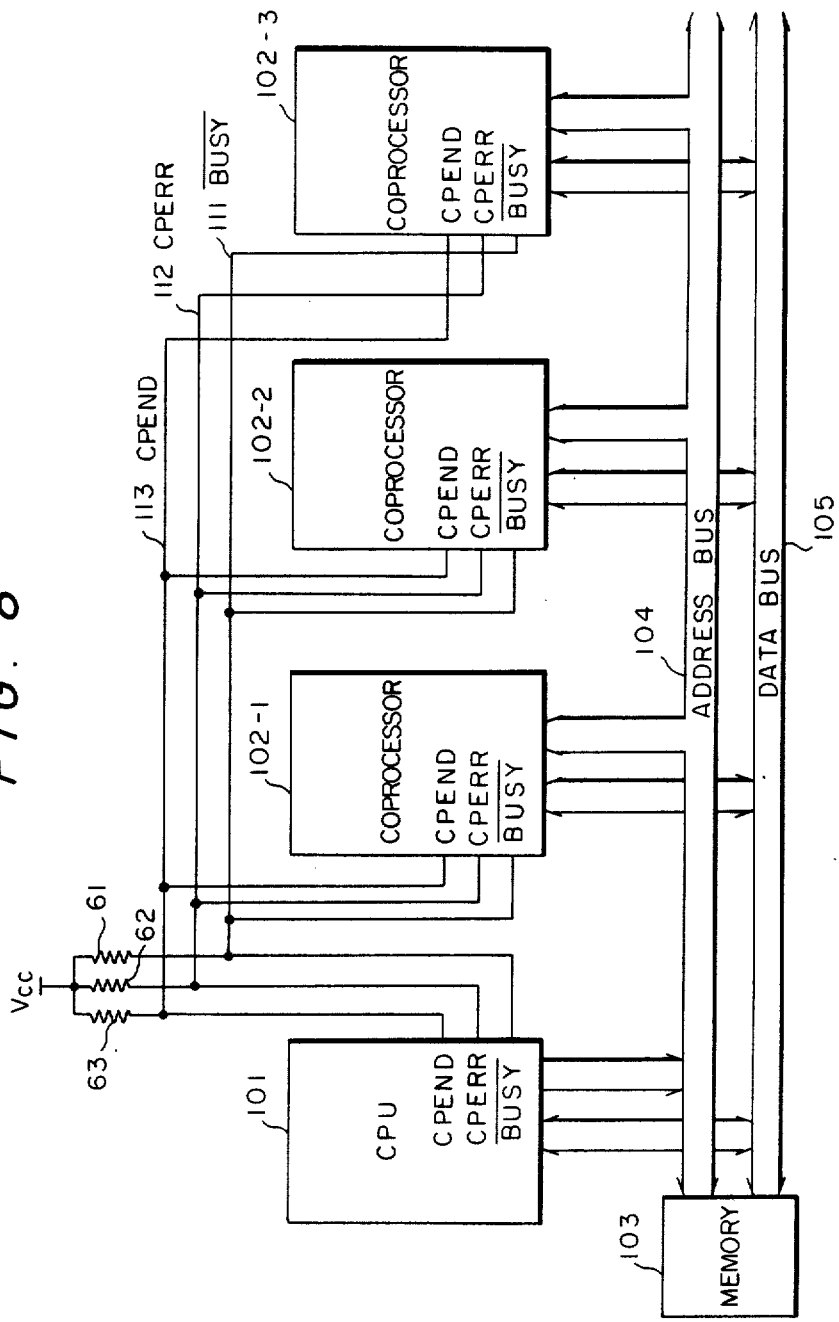
FIG. 8 is a block diagram representative of another embodiment of the present invention.

Referring to FIG. 8, a microcomputer system according to another embodiment of the present invention includes three slave processors (coprocessors) 102-1, 102-2 and 102-3. In this drawing, the same constituents as those shown in FIG. 1 are denoted by the same reference numerals. Each of the slave processors 102-1, 102-2 and 102-3 drives the signal lines 111, 112 and 113 by use of open-drain transistors. Accordingly, when any one of the slave processors 102-1, 102-2 and 102-3 drives the signal lines 111, 112 and 113 to the low level, the master processor 101 receives the low level of the BUSY, CPERR or CPEND signals.

Circuit operation of the system shown in FIG. 8 will be described below with reference to FIG. 9. At a time point $t_1$, all the slave processors 102-1, 102-2 and 102-3 are in the standby condition and store no arithmetic exception, so that the CPEND signal takes the active level (high level). The master processor 101 transfers a command code of the second type of instruction to the first slave processor 102-1 at a time point $t_2$ and starts to execute subsequent instructions at a time point $t_4$. When the second type of high level instruction to be executed by the second slave processor 102-2 is decoded and transferred thereto at a time point $t_5$, the master processor 101 detects the level of the CPEND signal at a time point $t_6$. Since the CPEND signal takes the inactive level (low level) at this time, the master processor 101 waits for the completion of the bus cycle (at a time point $t_7$) and detects the levels of the BUSY and CPERR signals (at time points $t_8$ and $t_9$). Since the second type of instruction is transferred to the second slave processor 102-2, the master processor 101 starts to execute subsequent instructions at the time point $t_9$.

Assume here that the arithmetic exception occurs in the first slave processor 102-1 at a time point $t_{10}$. This exception is not read out immediately, but is deferred to be informed to the master processor 101 until the processor 101 again accesses the first slave processor 102-1. At a time point $t_{11}$, the master processor 101 again accesses to the first slave processor 102 to transfer the first or second type of instruction. The master processor 101 detects the inactive level of the CPEND signal at a time point $t_{12}$, so that it waits for the completion of the bus cycle (at time point $t_{13}$) and for the change of the BUSY signal to the inactive level (a time point $t_{14}$). Since the first slave processor 102-1 holds the arithmetic exception, it changes the BUSY signal to the inactive level while holding the active level of the CPERR signal (at time point $t_{14}$). Therefore, the master processor 101 reads the exception status information from the status port of the first slave processor 102-1 and performs the processing operation for the exception.

The present invention is not limited to the above embodiments, but may be modified and changed without departing from the scope and spirit of the invention.

What is claimed is:

1. A processing system, comprising:
   a master processor;
   a coprocessor; and
   a bus interconnecting said master processor and said coprocessor;
   said coprocessor including,
      first means for producing a first signal which takes an active level when said coprocessor requests that said master processor be brought into a wait condition, said first signal taking an inactive level when said coprocessor allows said master processor to perform a subsequent operation,
      second means for producing a second signal which takes an active level at least when said first signal is changed from an active level to an inactive level in a state of occurrence of an arithmetic exception in said coprocessor, said second signal taking an inactive level at least when said first signal is changed from an active level to an inactive level in a state of no occurrence of said arithmetic exception in said coprocessor, and
      third means for producing a third signal which takes an active level when said coprocessor is free of execution of an instruction and of said arithmetic exception, said third signal taking an inactive level when said coprocessor starts to execute an instruction and maintaining an inactive level until said coprocessor completes execution of said instruction, said third signal further maintaining an inactive level when said arithmetic exception occurs in said coprocessor,
   said master processor including,
      a first terminal supplied with said first signal,
      a second terminal supplied with said second signal,
      a third terminal supplied with said third signal,
      fourth means for transferring an instruction to be executed by said coprocessor to said coprocessor via said bus,
      fifth means for detecting whether or not an instruction to be executed by said coprocessor is an instruction for which said coprocessor is required to return execution resultant data to said master processor,
      sixth means, coupled to said third terminal and responsive to a detection result of said fifth means representing that said instruction to be executed by said coprocessor is not an instruction in which said coprocessor is required to return execution resultant data to said master processor, for detecting a level of said third signal before said coprocessor starts to execute an instruction transferred to said bus,
      seventh means, responsive to a detection result of said sixth means representing that said third signal is at an active level, for executing at least one instruction simultaneously with execution by said coprocessor irrespective of levels of said first and second signals, and
      eighth means, responsive to a detection result of said sixth means representing that said third signal is at an inactive level, for bringing said master processor into said wait condition until said first signal is changed to an inactive level and for performing a subsequent operation responsive to a level of said second signal after said first signal is changed to an inactive level.

2. A processing system as claimed in claim 1, wherein said eighth means causes said master processor to execute an instruction without accessing said coprocessor when said second signal is at an inactive level.

3. A processing system as claimed in claim 1, wherein said sixth means accesses said coprocessor to read status information therefrom when said second signal is at an active level.

4. A processing system as claimed in claim 1, wherein said master processor further includes means, coupled to said first and second terminals and responsive to a detection result of said fifth means representing that an instruction to be executed by said coprocessor is an instruction for which said coprocessor is required to return execution resultant data to said master processor, for bringing said master processor into said wait condition until said first signal is changed to an inactive level and thereafter accessing said coprocessor to read execution resultant data therefrom when said second signal is at an inactive level and to read status information therefrom when said second signal is at an active level.

5. A method of operating a master processor and a coprocessor, comprising the steps of:
   transmitting a first signal from said coprocessor to said master processor, said first signal being at an active level when said coprocessor requests that said master processor be brought into a wait condition, said first signal taking an inactive level when said coprocessor allows said master processor to perform a subsequent operation;
   transmitting a second signal from said coprocessor to said master processor, said second signal being at an active level at least when said first signal is changed from an active level to an inactive level while an arithmetic exception occurs in said coprocessor, said second signal taking an inactive level at least when said first signal is changed from an active level to an inactive level in a state of no occurrence of said arithmetic exception in said coprocessor; and
   transmitting a third signal from said coprocessor to said master processor, said third signal taking an active level when both an arithmetic exception is not occurring in said coprocessor and said coprocessor is not executing an instruction, said third signal taking an inactive level when said coprocessor starts to execute an instruction and maintaining an inactive level until said coprocessor completes execution of said instruction, said third signal further maintaining an inactive level when said arithmetic exception occurs in said coprocessor;
   said master processor executing at least one instruction simultaneously with execution of instructions by said coprocessor irrespective of said first and second signals, when said third signal changes to an active level; and
   said master processor being in a wait condition when said third signal changes to an inactive level and remaining in said wait condition until said first signal is changed to an inactive level, said master processor resuming operations after said first signal is changed to an inactive level.

6. A method as claimed in claim 5, further comprising the steps of:
   transmitting an execution result from said coprocessor to said master processor when said second signal changes to an inactive level; and
   transmitting status information from said coprocessor to said master processor when said second signal changes to an active level.

* * * * *